United States Patent Office 2,733,230
Patented Jan. 31, 1956

2,733,230

LINEAR FILMFORMING POLYAMIDES INCLUDING 1.4-DIAMINO CYCLOHEXANE AND PROCESS

Hanns Ufer, Ludwigshafen (Rhine), Germany, assignor to Badische Anilin- & Soda-Fabrik Aktiengesellschaft, Ludwigshafen (Rhine), Germany No Drawing. Application December 11, 1951, Serial No. 261,147

Claims priority, application Germany December 20, 1950

2 Claims. (Cl. 260—78)

The present invention relates to linear filmforming polyamides and a process of producing same.

I have found that linear filmforming polyamides having especially valuable properties are obtained by condensing salts or mixtures of about equimolecular amounts of linear polyamides forming 1,4-diaminocyclohexanes and dicarboxylic acids with salts or mixtures of other polyamide-forming diamines and dicarboxylic acids and with aminocarboxylic acids. Polyamide-forming derivatives of these substances may also be employed.

Among the said 1,4-diaminocyclohexanes there may be mentioned 1,4-diaminocyclohexane itself and also nuclear-substituted derivatives thereof indifferent in the polyamide-forming reaction, as for example its halogen, alkyl and hydroxy derivatives.

Among polyamide-forming dicarboxylic acids there may be mentioned for example adipic acid, pimelic acid, azelaic acid, suberic acid, sebacic acid, nonane and decane dicarboxylic acids and thiodibutyric acid.

Other polyamide-forming diamines than 1,4-diaminocyclohexanes which may be employed are for example hexa-, hepta-, octa-, nona- or deca-methylene diamine, 4,4'-diaminodicyclohexylmethane or 1,4-tetramethyleneglycol-di-(omega-amino-propyl)-ether.

Among polyamide-forming aminocarboxylic acids there may be mentioned for example ε-aminocaproic acid, ω-amino-heptane acid and ω-amino-undecane acid and polyamide-forming derivatives thereof, as for example caprolactam.

The condensation is effected in the manner already known for the production of polyamides by heating to temperatures of 200° to 300° C., in particular 240° to 280° C., while excluding oxidising gases, if desired under an initial pressure and in the presence of stabilisers.

By varying the nature and amount of the individual initial materials it is possible to vary the properties of the polyamides within wide limits. The amount of the 1.4-diaminocyclohexane employed should however in general not exceed 25% because otherwise the polyamide flows badly and can only be removed from the condensation vessel with difficulty in the form of a melt.

The polyamides obtained are distinguished by good transparency and water-repellency. At the same time their solubility and consequently the stability of the solutions at room temperature is quite considerably increased, and this is of special importance for the industrial production of cast foils and coatings. Moreover the range of temperature within which they are plastic is generally greater so that they can be worked up without difficulty. The mechanical properties, such as tensile strength and impact strength, of shaped articles are also good.

The polyamides according to this invention are suitable for example for the production of films, foils, threads, coatings, safety-glass and shaped articles of a great variety of kinds.

The following example will further illustrate this invention but the invention is not restricted to this example. The parts are by weight.

Example 400 parts of ε-caprolactam, 400 parts of hexamethylenediamine adipate, 200 parts of 1,4-diaminocyclohexane adipate, 0.35 part of adipic acid and 1000 parts of water are heated during the course of 2 hours to 270° to 275° C. in a pressure tight vessel of stainless steel while excluding oxygen, the pressure being kept at 17 to 18 atmospheres by allowing the appropriate amount of steam to escape. While keeping the whole at the same temperature, the pressure is slowly released during 1½ hours and the reaction material kept at the same temperature for another 3 hours at atmospheric pressure. After transferring the resulting melt from the condensation vessel into water, a polyamide is obtained which is clearly soluble in hot 80% methanol or ethanol, and still better in a mixture of 70 parts of methanol, 15 parts of benzene and 15 parts of water. The solutions are stable for a very long time when allowed to stand at room temperature. Films obtained therefrom have a good transparency and good mechanical strength. They also show great resistance upon bending in warm water.

A similar polyamide is obtained by working up 500 parts of hexamethylene diamine adipate, 400 parts of ε-caprolactam and 100 parts of 1,4-diaminocyclohexane adipate in the above-mentioned way or by using hexamethylenediamine sebacate instead of hexamethylenediamine adipate and ω-amino-undecane acid instead of ε-caprolactam.

1,4-diamino-2-methyl- or -butyl-cyclohexane may also be used instead of 1,4-diaminocyclohexane.

What I claim is:

1. A linear film-forming polyamide produced by the condensation of from at least 4.4 percent to at most 25 percent of 1,4-diaminocyclohexane with about an equimolecular amount of adipic acid, ε-caprolactam, and hexamethylene diamine adipate.

2. A process for the production of a linear film-forming polyamide which comprises condensing 1,4-diaminocyclohexane with about an equimolecular amount of adipic acid, epsilon-caprolactam and hexamethylenediamine adipate, the 1,4-diaminocyclohexane comprising at least 4.4% to at most 25% of the reaction mass.

References Cited in the file of this patent

UNITED STATES PATENTS

| 2,130,523 | Carothers | Sept. 20, 1938 |
| 2,181,663 | Martin | Mar. 28, 1939 |
| 2,245,129 | Greenwalt | June 10, 1941 |
| 2,252,555 | Carothers | Aug. 12, 1941 |
| 2,461,495 | Floyd | Feb. 8, 1944 |

OTHER REFERENCES

Catlin et al.: J. Polymer Science, vol. 2, No. 4, 1947, pp. 412 to 419.